(12) United States Patent
Dowers, II et al.

(10) Patent No.: US 8,566,297 B1
(45) Date of Patent: Oct. 22, 2013

(54) METHOD TO SPOOF DATA FORMATS FROM IMAGE BACKUPS

(75) Inventors: Gregory R. Dowers, II, Lake Mary, FL (US); Kirk L. Searls, Maitland, FL (US)

(73) Assignee: Symantec Corporation, Mountain View, CA (US)

( * ) Notice: Subject to any disclaimer, the term of this patent is extended or adjusted under 35 U.S.C. 154(b) by 415 days.

(21) Appl. No.: 12/687,438

(22) Filed: Jan. 14, 2010

(51) Int. Cl.
*G06F 17/30* (2006.01)

(52) U.S. Cl.
USPC .......................................... 707/703; 711/162

(58) Field of Classification Search
USPC ............................. 707/999.204, 703; 711/162
See application file for complete search history.

(56) References Cited

U.S. PATENT DOCUMENTS

| | | |
|---|---|---|
| 5,487,167 A | 1/1996 | Dinallo et al. |
| 5,581,764 A | 12/1996 | Fitzgerald et al. |
| 5,708,796 A | 1/1998 | Ozden et al. |
| 5,712,976 A | 1/1998 | Falcon, Jr. et al. |
| 5,742,768 A | 4/1998 | Gennaro et al. |
| 5,745,380 A | 4/1998 | Sandvoss et al. |
| 5,754,774 A | 5/1998 | Bittinger et al. |
| 5,761,477 A | 6/1998 | Wahbe et al. |
| 5,764,235 A | 6/1998 | Hunt et al. |
| 5,765,164 A | 6/1998 | Prasad et al. |
| 5,787,284 A | 7/1998 | Blainey et al. |
| 5,802,292 A | 9/1998 | Mogul |
| 5,835,749 A | 11/1998 | Cobb |
| 5,878,223 A | 3/1999 | Becker et al. |
| 5,919,247 A | 7/1999 | Van Hoff et al. |
| 5,933,644 A | 8/1999 | Wallace |
| 5,974,129 A | 10/1999 | Bodnar |
| 5,978,788 A | 11/1999 | Castelli et al. |
| 5,978,791 A | 11/1999 | Farber et al. |
| 6,003,087 A | 12/1999 | Housel, III et al. |
| 6,009,410 A | 12/1999 | LeMole et al. |

(Continued)

FOREIGN PATENT DOCUMENTS

| | | |
|---|---|---|
| WO | WO97/00475 | 1/1997 |
| WO | WO97/46955 | 12/1997 |
| WO | WO98/11723 | 3/1998 |

OTHER PUBLICATIONS

Microsoft, "Virtualization for Windows: A Technology Overview," David Chappell, Chappell & Associates, Jul. 2007.

(Continued)

*Primary Examiner* — Monica Pyo
(74) *Attorney, Agent, or Firm* — Rory D. Rankin; Meyertons, Hood, Kivlin, Kowert & Goetzel, P.C.

(57) ABSTRACT

A system and method for efficiently accessing large data storage subsystems with a different file format than a format used by running applications. A backup server is coupled to a data storage medium, and is configured to store data on the data storage medium according to a first file format. A client is coupled to the backup server and is configured to convey memory access requests for data stored in the data storage medium. The client is unable to decipher the first file format. A filter driver in the backup server is coupled to intercept the requests from the client. The filter driver is configured to decipher the first file format; spoof the existence of one or more spoofed files that do not exist on the data storage medium, wherein each of the one or more spoofed files corresponds to data stored on the data storage medium; and present the spoofed files to the client.

20 Claims, 7 Drawing Sheets

(56) References Cited

U.S. PATENT DOCUMENTS

| | | | |
|---|---|---|---|
| 6,073,129 A | 6/2000 | Levine et al. | |
| 6,088,524 A | 7/2000 | Levy et al. | |
| 6,122,628 A | 9/2000 | Castelli et al. | |
| 6,289,426 B1* | 9/2001 | Maffezzoni et al. | 711/173 |
| 6,311,221 B1 | 10/2001 | Raz et al. | |
| 6,857,059 B2 | 2/2005 | Karpoff et al. | |
| 6,898,670 B2 | 5/2005 | Nahum | |
| 6,934,799 B2 | 8/2005 | Acharya et al. | |
| 7,007,147 B2 | 2/2006 | Eguchi et al. | |
| 7,093,086 B1 | 8/2006 | van Rietschote | |
| 7,386,662 B1 | 6/2008 | Kekre et al. | |
| 7,735,057 B2 | 6/2010 | Rachman et al. | |
| 7,934,066 B2* | 4/2011 | Mu et al. | 711/162 |
| 2004/0230971 A1 | 11/2004 | Rachman et al. | |
| 2008/0010630 A1 | 1/2008 | Ou-Yang et al. | |
| 2009/0048900 A1* | 2/2009 | Moore | 705/10 |
| 2010/0250931 A1* | 9/2010 | Andersen et al. | 713/168 |

OTHER PUBLICATIONS

Microsoft, "Windows Server Virtualization—An Overview," May 2006.
"Virtualization from the Datacenter to the Desktop, Building a Comprehensive, end-end virtualization strategy," 2007 Core Infrastructure Optimization, Microsoft Corporation 2007.
U.S. Appl. No. 11/009,108, filed Dec. 10, 2004.
"What is Volume Shadow Copy Service?," Microsoft Corporation, 2004, 5 pages.
Yang Yu, et al: "A Feather-weight Virtual Machine for Windows Applications"; Jun. 14, 2006; pp. 24-34.
Japanese Patent Application Laid-open No. Hei 10-133976.
Japanese Patent Application Laid-open No. Sho 64-36332.
Japanese Patent Application Laid-open No. Hei 10-162057.
G. Glass, "A Universal Streaming Service", C++ Report, Apr. 1996, pp. 74-76 and 81-83.
T. Ritchey, "Java", New Riders Publishing, Dec. 1995, pp. 214-216.
Chen, Z. et al., (Dec. 11-14, 1995) "Real time video and audio in the world wide web" World Wide Web Journal, Fourth International World Wide Web Conference, pp. 333-348,.
Jiang, Z. and Kleinrock, L. (1997) "Prefetching links on the WWW" IEEE International Conference on Communications (ICC), US, New York, NY: IEEE, pp. 483-489.
M. Schwartz, "Telecommunication Networks: Protocols, Modeling and Analysis", Jan. 1, 1987; Addison-Wesley Publishing Company, pp. 266-283.
J. Basu et al., "Degrees of Transaction Isolation in SQL *Cache: A Predicate-based Client-side Caching System", May 15, 1996, pp. 1-22.
Amit Shukla et al., "Storage Estimation for Multidimensional Aggregates in the Presence of Hierarchies", VLDB Conference Mumbai (Bombay), 1996, pp. 522-531.
Dale Skeen, "New Forms of Persistent Queries Are Necessary to Handle Live Business Data As It Speeds Through A Company", internet website www.byte.com BYTE Magazine, Feb. 1998, 5pgs.
V. Hoff et al., "The Open Software Description Format (OSD)", internet website www.w3.org, Aug. 11, 1997, pp. 1-13.
Red Brick Vista, "Aggregate Computation and Management", internet website www. informix.com, printed Oct. 4, 2000.
Fireclick, "Web Site Performance is Key to E-Commerce Sucess", internet website WWW. Fireclick.com printed, Nov. 1, 2000.
Boost Web Optimizer Technology Overview, "How it Works", Sep. 27, 2000 and internet website www.boostworks.com printed Nov. 1, 2000.
"Delivering Windows to the Net White Paper", WinToNet by Menta Software, 2000 and Website http://216.205.21.102/ printed Nov. 1, 2000.
"First There was Streaming Audio, then Streaming Video. Now get ready for Streaming Software", Stream Theory White paper and Website WWW.Streamtheory.com printed Sep. 22, 2000.
"OSD Describing Software Package on the Internet", Marimba Inc. White paper 1998 and wedsite www.marimba. com, printed Nov. 1, 2000.
"Timbale for Windows Terminal Services" Marimba Promotional document, undated, 2000.
Japanese Patent Application Laid-open No. Hei 8-51596.
Japanese Patent Application Laid-open No. Hei 10-91446.
Japanese Patent Application Laid-open No. Hei 7-271603.
Japanese Patent Application Laid-open No. Hei 8-6878.
"XMP, Adding Intelligence to Media, XMP Specification Part 3, Storage Files"; Adobe Systems Incorporated, 2008, pp. 1-86.
Japanese Patent Application Laid-open No. Hei 10-133976, May 1998.
Jaoanese Patent Application Laid-open No. Sho 64-36332, Feb. 1989.
Japanese Patent Application Laid-open No. Hei 10-162057, Jun. 1998.
Japanese Patent Application Laid-open No. Hei 8-51596, Feb. 1996.
Japanese Patent Application Laid-open No. Hei 10-91446, Apr. 1998.
Japanese Patent Application Laid-open No. Hei 7-271603, Oct. 1995.
Japanese Patent Application Laid-open No. Hei 8-6878, Dec . 1996.

* cited by examiner

METHOD TO SPOOF DATA FORMATS FROM IMAGE BACKUPS

BACKGROUND OF THE INVENTION

1. Field of the Invention

This invention relates to the field of computing system data backup and, more particularly, to access and restoration of previously backed up data.

2. Description of the Related Art

As computer memory storage and data bandwidth increase, so does the amount and complexity of data that business and individuals must manage. A large portion of the data may involve content managed for a company or home workgroup by a dedicated server. This dedicated server may include or be coupled to a data storage subsystem comprising hard disks or other storage devices for the storage of a large amount of information. This dedicated server and storage subsystem may provide users the ability to search and access information, including electronic documents, photographic or other still images, video streams, audio files, volume image backup files, etc.

Because the various examples of stored data may frequently contain crucial information, the contents of information servers may be archived or backed up to an archival or a backup storage to prevent loss of data. In such a case, the dedicated server and storage subsystem may include a backup system. For example, a back-end database provided within the server and storage subsystem is often backed up as a single, monolithic database file. This database file contains all the tables, records, and indexing information for the database.

For many of the uses of the image backup file, a customer may desire to view and/or retrieve information stored within the image backup file. Many common file formats exist that allow an easy, compatible transfer of data between a backup system and a customer's software applications. An image backup file that utilizes a common file format may be supported by a variety of applications provided by a variety of vendors. Some examples of common disk image file formats include virtual hard disk (VHD), V2i, and virtual machine disk (VMDK).

However, in some cases, a backup system may create and store an image backup file in a proprietary file format that is particular to the backup system or is otherwise not widely supported. For example, a backup system may utilize single-instance storage (SIS) in order to reduce data storage requirements. However, the format utilized by the SIS system may not be supported by other vendor's applications. Other proprietary formats may be used as well. Consequently, customers may have backup images created according to a format that is not supported by other applications that the customer uses.

In view of the above, methods and mechanisms for enabling applications to utilize data backed up in a format foreign to the application are desired.

SUMMARY OF THE INVENTION

Systems and methods for efficiently enabling applications to utilize data backed up in a format foreign to the application are contemplated. In one embodiment, a computer system is provided including a backup system. The backup system utilizing a data storage medium stores data according to an organization specified by a first file format. A client computer that is unable to decipher the first file format conveys memory access requests for data stored in the backup system. In one embodiment, a filter driver in the backup server is coupled to intercept the requests from the client. The filter driver is configured to decipher the first file format; spoof the existence of one or more spoofed files that do not exist on the data storage medium, wherein each of the one or more spoofed files corresponds to data stored on the data storage medium; and present the spoofed files to the client.

In various embodiments, each spoofed file presented to the client consumes no space in the computer system. Additionally, the client may be unaware that the backup data is stored according to a non-supported format. In some embodiments, the user may select one or more spoofed files for access. The filter driver may intercept requests from the client and convert these requests to correspond to the first file format utilized by the backup storage medium. In a similar manner, the filter driver is configured to convert retrieved data from the backup system to data utilizing an organization specified by the second file format utilized by the client. The converted retrieved data is conveyed to the client.

These and other embodiments are described and contemplated, and will be appreciated upon reference to the following description and figures.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

Figure 1:
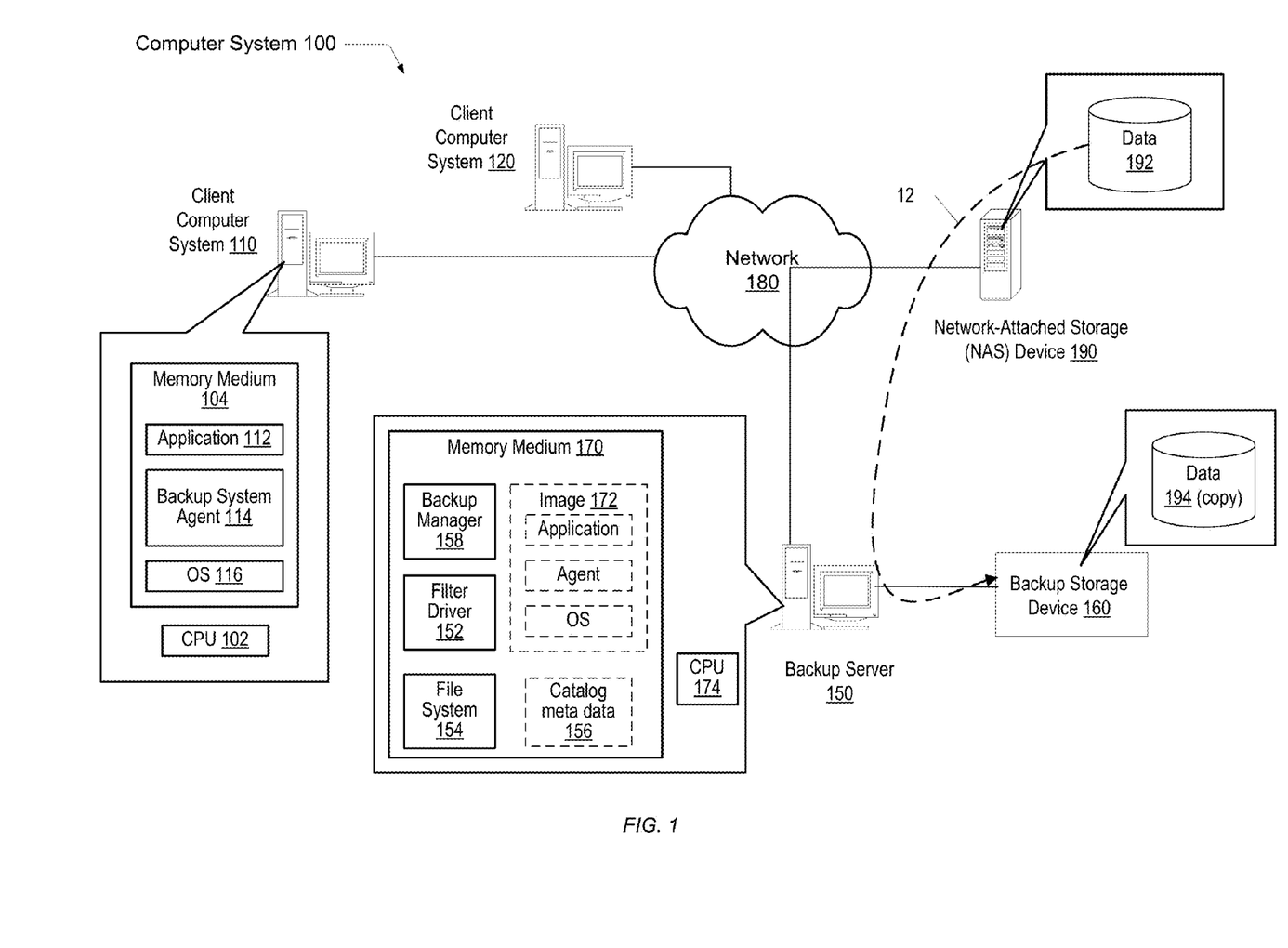
FIG. 1 is a generalized block diagram illustrating one embodiment of a computer system.

Referring to FIG. 1, a generalized block diagram of one embodiment of a computer system 100 is shown. As described further below, computer system 100 may include a filter driver 152 that is configured to detect the data storage format of shared backup storage device 160 and present, or "spoof", the existence of backup image files in commonly known file formats in one or more directories on the file system 154. A user may browse these directories via the file system 154. When browsing, it would appear that backup server 150 and shared backup storage device 160 include image backup files in these common file formats, although they do not. Filter driver 152 may intercept requests, such as restore requests or other requests to retrieve or otherwise access data, from client computer systems 110 and 120; convey requests to the file system 154 corresponding to a proprietary file format; retrieve the requested data of the intercepted requests; and convey the requested data to the client computer systems 110 and 120 in the commonly known file formats. FIG. 1 illustrates an example of a system capable of the described features according to one embodiment. Further details are provided below.

As shown, system 100 includes client computer systems 110 and 120 interconnected through a network 180 to one another, to a Network-Attached Storage (NAS) device 170 and to a backup server 150. Disk storage 160 is coupled to backup server 150. Network 180 may include a variety of techniques including wireless connection, direct local area network (LAN) connections, wide area network (WAN) connections such as the Internet, a router, and others. Network 180 may comprise one or more LANs that may also be wireless. Network 180 may further include remote direct memory access (RDMA) hardware and/or software, transmission control protocol/internet protocol (TCP/IP) hardware and/or software, router, repeaters, switches, grids, and/or others.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

In one embodiment of computing system 100, client computer systems 110 and 120 are representative of any number of stationary or mobile computers such as desktop PCs, workstations, laptops, handheld computers, blade servers, etc. In some embodiments the client computer systems, or clients, 110 and 120 may include an operating environment, e.g. an operating system, such as OS 116. The operating system may interface between the system hardware and the software applications. The clients 110 and 120 may include a processor 102 and a memory medium 104. The clients 110 and 120 may contain one or more applications on its memory medium 104, such as application 112. Clients 110 and 120 may use processor 102 to execute instructions of software application 112. The data that holds the information used and produced by application 112 and stored for later use may be referred to as a computer file, or file. Computer files may include photographic or other still images, documents, video streams, audio files, plain text files, or any other kind of data.

Clients 110 and 120 may be configurable to execute one or more virtual machines that may operate within any particular virtualization platform. Virtualization platform software may be provided by Symantec Corp., VMWare, Inc., Microsoft Corp., and others. Each virtual machine 50 may maintain its own set of files, similarly as a physical computer would, such as operating system files, application program files, data files, etc. Whereas the files of a physical computer are typically stored on a hard disk, the files of each virtual machine may be stored in one or more virtual disk image files. A virtual disk image file may be formatted according to a particular specification. Virtual disk image file specifications in common use include at least the Virtual Hard Disk (VHD) format, the V2I format, and the Virtual Machine Disk Format (VMDK) format.

In addition to including software application 112 on memory medium 104, clients 110 and 120 may contain backup system agent software 114 on the memory medium 104. The backup system agent 114 may be software configured to assist a backup manager, such as the backup manager 158 on the backup server 150, to perform one or more backup functions. In some embodiments the backup system agent 114 may also be configured to perform one or more backup functions independently of a backup manager 158. A further description of the backup manager 158 on the backup server 150 is provided shortly below.

In various embodiments a Network-Attached Storage (NAS) device 190 may be any kind of device configured to store data. The NAS device 190 may be a computer specialized for providing file storage services to clients 110 and 120. The operating system and other software on the NAS device 190 provide the functionality of file systems, and access to files, and the management of these functionalities. A NAS device 190 is typically not designed to perform general-purpose computing tasks other than file storage. The NAS device 190 may not have a keyboard or display, and is instead controlled and configured over the network 180, sometimes by accessing their network address from a web browser.

Continuing with a description of the NAS device 190, a general-purpose operating system is usually not needed on the NAS device 190. Rather, a stripped-down operating system with minimal functionality may be used instead. The NAS device 190 may include one or more hard disks, often arranged into logical, redundant storage containers or RAID arrays (redundant arrays of inexpensive/independent disks). The data 192 may be stored on one or more of the hard disks of the NAS device 190.

The NAS device 190 may provide data storage at the file system level. The NAS device 190 may use file-based protocols such as Network File System (NFS) (popular on UNIX systems), SMB/CIFS (Server Message Block/Common Internet File System) (used with MS Windows systems), or AFP (used with Apple Macintosh Computers). In the example of FIG. 1, files on the NAS device 190 may be accessed through a Network File System (NFS) interface included in network 180.

Turning now to the backup server 150 in computer system 100, the backup server 150 may include a backup application 158. This backup application 158, or "backup manager" may comprise program instructions stored on the memory 170 and executable by the processor 174 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

As noted above, the backup system agent 114 on client 110 may assist the backup manager 158 on backup server 150. The backup manager 158 may be configured to create a volume image backup. In some embodiments, the backup manager 158 may receive user input directing the backup manager 158 to create a volume image backup of a specific system. In some embodiments, the backup manager 158 may create a volume image backup of a specific system automatically, e.g., the backup manager may be scheduled to perform regular backups of a specific system. As one example, the backup manager 158 might create a volume image backup of the client 110. The image 172 created may thus include images of the application 112, the backup system agent 114, and the OS 116, as well as any other software components on the client 110. As part of creating the volume image backup of the client 110, the backup manager 158 may also create catalog metadata 156 associated with the image 172.

The catalog metadata 156 created by the backup manager 158 during a backup operation for client 110 may include metadata for the image, e.g., metadata for application 112 and the other components of the image. Metadata may include at least one or more of the following: a data name, data size, a fingerprint of the data, a batch number, as well as data type, version number, ownership, permissions, modification time, error code, etc. A batch number may be used to identify the particular backup operation in which an associated backup entry was created. Other forms of metadata and/or identifiers will be apparent to those of ordinary skill in the art. The catalog metadata 156 may be usable for restore browsing, e.g., at a later time. For example, the data layout of stored information in backup storage device 160 may be stored in the catalog 156.

In one embodiment, the backup server 150 comprises a file system 154 that operates as a special-purpose database for the storage, organization, manipulation, and retrieval of data. File system 154 may provide access to data by operating as clients for a network protocol or file system 154 may be virtual and exist only as an access method for virtual data. A user may browse the directories stored on backup storage device 160 via the file system 154.

The file system 154 in backup server 150 may be coupled to one or more filter drivers. Although only a single filter driver 152 is shown in FIG. 1, multiple filter drivers may exist. Generally speaking, a file system filter driver 152 may be configured to intercept requests targeted at a file system 154 or another file system filter driver. By intercepting a request before the request reaches its intended target, the filter driver 152 may extend or replace the functionality provided by the original target of the request. Examples of file system filter drivers include anti-virus filters, backup agents, and encryption products. Filter driver 152 may be used to eliminate file format compatibility issues as further described later.

Returning to a data backup operation, in one embodiment, the backup manager 158 on backup server 150 may create the volume image backup and store it on the backup storage device 160. In another embodiment, the backup manager 158 may store the volume image backup on the backup server 150, e.g., on a memory 170 of the backup server 150, as shown. In yet other embodiments, the backup manager 158 may instead store the volume image backup on another device, e.g., on another computer system (such as another server) connected over the network 180. In any of the embodiments, a backup copy 194 of the data 192 may be subsequently restored to the NAS device 190 (or to another computer system) in the event that it becomes necessary to do so. Recovery of the backup copy 194, such as a volume image backup file, may have a variety of uses. For example, it may be used during system deployment for the setup of many computers. Another use may include data recovery. The image-level backup file may allow rapid restoration of a system after data loss caused by an operating system crash, a virus attack, hardware failure, or otherwise.

In addition to the above, the backup copy 194 may allow for a bare metal recovery, wherein the backed up data is available in a form that allows for a computer system restoration from "bare metal", or without any requirements of a previously installed software or operating system. In such a case, the backed up data typically includes the necessary operating system, applications, and data components to rebuild the backed up system to an entirely separate platform. During deployment, recovery, or other use of the backup data, if only certain files are needed, then it is possible to connect the image backup file as a virtual disk and then copy only the needed files from the image backup file using a file utility software program.

It is noted that the backup copy 194 may not be formatted in a similar manner as the original copy of the data 192. The many available backup products may each use a commonly known file format or alternatively a proprietary file format for the storage of data. In the case of a proprietary file format, a client application may not be able to decipher retrieved information corresponding to the proprietary file format. In such a case, an application 112 executing on client 110 may not be able to proceed.

In one embodiment, the volume image backup file discussed above may contain the complete contents and structure representing a storage medium, such as data 192 on NAS device 190. This volume image backup file may be created by performing a complete sector-by-sector, or alternatively, a byte-by-byte, copy of the data on storage mediums within NAS device 190. This copy thereby replicates the structure and contents of this data. A volume image backup file may contain all files and may replicate all data. In another embodiment, a backup system only backs up user files. The backup system may not backup boot information and files locked by the operating system, such as those in use at the time of the backup. Such a backup may not refer to a volume image backup file, since a volume image backup file replicates all data. Similarly, some disk imaging utilities omit unused file space from source media, or compress the disk they represent to reduce storage requirements. The resulting files are typically referred to as archive files, as they are not literally disk images. Therefore, data in backup storage device 160 may not be "portable", or may not be easily copied to alternative locations for various purposes. Regardless of the type of backup file, this file may be stored on backup storage device 160 in an uncommon file format. Although, the below description refers to a volume image backup file, the below methods and systems may be used with any type of backup file or any type of data file.

In an embodiment where the backup manager 158 creates the volume image backup and stores it on the backup storage device 160, the backup storage device 160 may include or be further coupled to storage consisting of one or more hard disks, tape drives, server blades, or specialized devices, and may include a variety of memory devices such as RAM, Flash RAM, MEMS (MicroElectroMechanical Systems) storage, battery-backed RAM, and/or non-volatile RAM (NVRAM), etc. The backup manager 158 may create and store the volume image backup in a commonly known file format, such as VHD, VMDK, V2I, or otherwise. Alternatively, the backup manager 158 may create and store the volume image backup in a proprietary file format. In this case, the corresponding application, such as the backup manager 158, used to create the volume image backup may need to be used in order to both view and access the volume image backup.

As described earlier, a computer file is a block(s) of data that holds the information used and produced by software applications, such as application 112, compilers, operating systems, or otherwise. A computer file may be stored for later use. As is well known, a file format of data, and if applicable, the metadata, provides the significance of the corresponding binary bit positions and values used to represent the data and corresponding metadata. The file format may also determine a particular manner of accessing the data. Data may be stored, accessed, and modified according to multiple file formats. A filename extension may be used to indicate the file format of a computer file. One example of an indication of the file format is a suffix added to the name of a computer file. This suffix, or filename extension, may be used to group, process, or identify computer files with a similar file format. Examples of filename extensions include .txt for plain text files, .java for the Java programming language, .vmdk for the Virtual Machine Disk image file format, and .vhd for the Virtual Hard Disk image file format. Other filename extensions are possible and contemplated.

Both computers and file servers may include file systems used to store data in memory devices, as described above, wherein the file systems and memory devices utilize a separate file format from the applications executing on the computers. In addition, an operating system on a file server may have a file system that stores data formatted as a single stream. Applications on computers may access this data and may interface with the file server via a predetermined interface. However, in one example, this interface and corresponding file format may store data with a file format that supports multiple streams in a single instance storage. These differences may lead to compatibility problems.

The various combinations of file formats for data used in a computing system including the use by multiple applications, by multiple versions of applications, and by multiple file systems may cause interoperability problems. These problems may lead to cases where a user is unable to perform work with an application since the application or a file system is unable to recognize a file format of the corresponding data.

Figure 2:
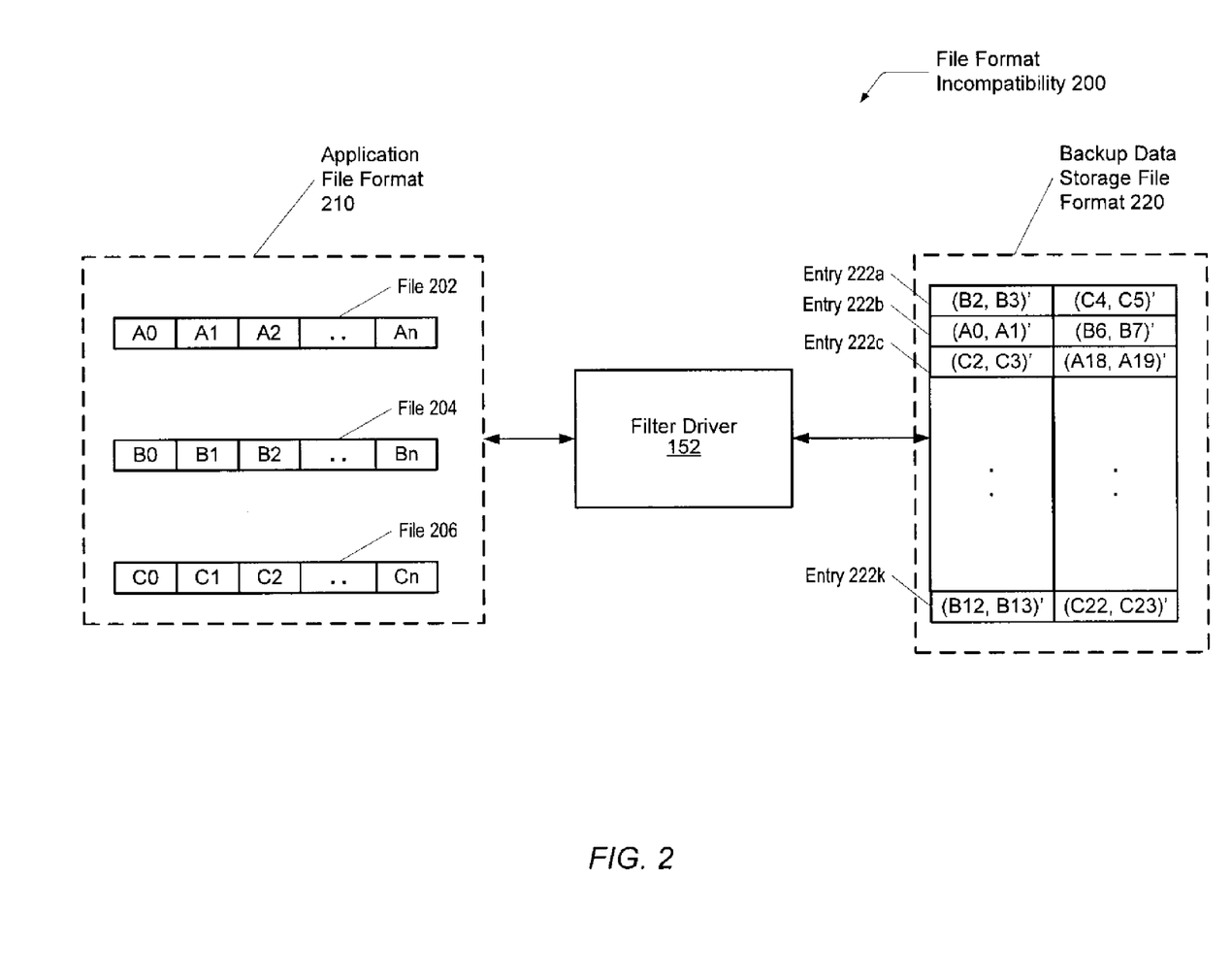
FIG. 2 illustrates one embodiment of file format incompatibility.

Turning now to FIG. 2, a generalized block diagram of one embodiment of file format incompatibility 200 is shown. In the embodiment shown, there is a file format difference between a client executing a software application and data storage on a backup server coupled to the client through a network. The computing system 100 shown in FIG. 1 illustrates one example of such a system. The various types of data such as still images, documents, video streams, audio files, plain text files, volume image backup files, and other, each have several available file formats associated with them. Incorporating the multiple associated applications, the multiple versions of applications, and so forth, as mentioned above, causes interoperability problems to be common. The file format 210 and the data storage file format 220 are illustrated in a general manner. File formats specify a particular manner that information, or data, is encoded for storage. A file format may specify at least an arrangement, an encoding algorithm, and a data transfer rate for the information.

The generalized example shown in FIG. 2 illustrates an application file format 210 that divides files 202-206 into partitions. For example, file 202 comprises the partitions A0, A1, and so forth. These partitions may or may not be of equal length. File 202 may include a header file or table that provides offsets for other tables or sections of information. Each partition may or may not include an initial value, such as a predetermined hex value, that specifies a section type or an information type included in the corresponding partition. Many different formats may be used to describe file format 210.

In addition to file format 210 providing several choices for arranging data, the file format 210 may be associated with a particular data transfer protocol. One such protocol may determine the partitions, such as A0, A1, and so forth, be transmitted in a particular order, such as a sequential order. Also, a protocol may determine the partitions be transmitted one at a time. Other transmission options are possible and contemplated.

Similar to file format 210, the backup data storage file format 220 may provide several choices for data arrangement and a transfer protocol. The file format 220 used in the plurality of entries 222a-222k of a data storage medium may not be compatible with file format 210. File format 220 may use one of several data storage algorithms and methods. As shown in FIG. 2, file format 220 may use an encoding algorithm that combines two partitions of files 202-206. This encoding and storage is indicated for partitions B2 and B3 as (B2, B3)' in entry 222a. The file format 220 may combine two partitions in a predetermined manner set by an encoding algorithm. A single entry 222 may store partitions from separate files marked by offsets. For example, the partitions C4 and C5 are stored in entry 222a along with partitions B2 and B3. Also, it is noted the partitions are not stored in groups associated with a file or in a sequential order. A data storage manager may find such an arrangement to be optimal for storage, security, or other reasons. The description here for file format 220 is a generalized description that does not indicate a particular format in industry. The description here is used to illustrate a format 220 very different from format 210 and reasons for such a difference. Particular examples may be numerous and are well known across multiple industries.

Similar to file format 210, the file format 220 may be associated with a particular data transfer protocol. One such protocol may determine the portions of an entry 222 corresponding to a particular requested file be transmitted in groups greater than one, wherein the groups may or may not be decoded beforehand, and at a rate different from a rate specified by file format 210. Other transmission options are possible and contemplated.

As stated earlier, an application may be executing on a client that processes files stored with a file format 210. In one embodiment, the file format 210 may be represented by the formats VHD, VMDK, or V2I. This application may request a particular file from a data storage medium that stores data according to file format 220. In one embodiment, the file format 220 may be represented by a proprietary file format associated with a particular backup and restore software application. If the file, such as file 206, is received by the client in an arrangement and transmission rate determined by file format 220, rather than by the file format 210, then the application may not be able to process the file. For example, a portable storage device, such as a compact disc (CD), a digital versatile disc (DVD), a universal serial bus (USB) jump drive, or otherwise, may store a data recovery environment application. The portable storage device may be connected to a peripheral interface, such as a disk drive or a USB port, on a client, such as client 110 of FIG. 1. This environment may allow a data recovery system to be booted from the portable storage device. An application on the portable storage device may enumerate an image backup file or other data on a data storage medium, such as backup storage device 160 in FIG. 1. The application may present the data to the user, such as through a graphical user interface (GUI), and then the user may select a volume image backup file to recover. However, if the data storage medium utilizes a file format, such as a single-instance storage or a proprietary file format, then the application on the portable storage device may not be able to decipher retrieved information.

As shown in FIG. 2, a filter driver 152 may receive requests utilizing file format 210 from an application executing on a client, convey requests to a data storage medium utilizing the file format 220, receive retrieved information or files from the data storage medium utilizing the file format 220, and send the retrieved files utilizing the file format 210 to the client. In order to simplify the illustration, a backup server, a file system, a network, and so forth, are not shown. However, these components are shown in one embodiment of a system in FIG. 1. What is appreciated here is the filter driver 152 may perform a conversion between the file formats 210 and 220.

In addition to providing file format conversion capabilities, the filter driver 152 may be configured to interface with a backup storage medium or its accompanying system, and determine the data storage file format 220 utilized by the data storage medium. After reading a catalog, such as catalog metadata 156 of FIG. 1, the filter driver 152 may expose the data in a network shareable manner. The filter driver 152 may present, or "spoof", the existence of backup image files utilizing commonly known file formats in one or more directories on a file system, such as file system 154. A user may browse these directories via the file system 154. When browsing, it would appear that a backup system, such as backup server 150 and backup storage device 160 of FIG. 1, includes image backup files in these common file formats, although they do not. These spoofed image files may not consume any space of their own on the file system 154. The directories of file system 154 may appear on a graphical user interface (GUI). The browser output may show files in directories that actually do use the commonly known file formats. In addition, the browser output may show the spoofed files.

Each of the one or more spoofed files presented to the client corresponds to one of the one or more computer files determined to be stored on the data storage medium. In addition, each of the one or more spoofed files has a corresponding identifier that indicates the spoofed file contains data organized by a file format that is decipherable by the client. In one embodiment, this identifier comprises both a same filename as a corresponding computer file determined to be stored on the data storage medium and a filename extension corresponding to the file format decipherable by the client. Other embodiments for the identifier are possible and contemplated.

In one example, the data storage medium may store a data image file with a corresponding filename backup_presentation_0209.sis. A client may not be able to decipher files utilizing a single instance storage file format, which may be indicated by a .sis file extension. However, the client may be able to decipher files utilizing a Virtual Hard Disk file format, which may be indicated by a .vhd file extension. The filter driver may present a spoofed file, backup_presentation_0209.vhd, which both consumes no space in the computer system and corresponds to the file backup_presentation_0209.sis. A user browsing the contents of the data storage medium with a GUI may view the spoofed file backup_presentation_0209.vhd, since this file is presented by the filter driver as existing on the data storage medium. The user may select this spoofed file to be used in an application executing on the client.

Figure 3:
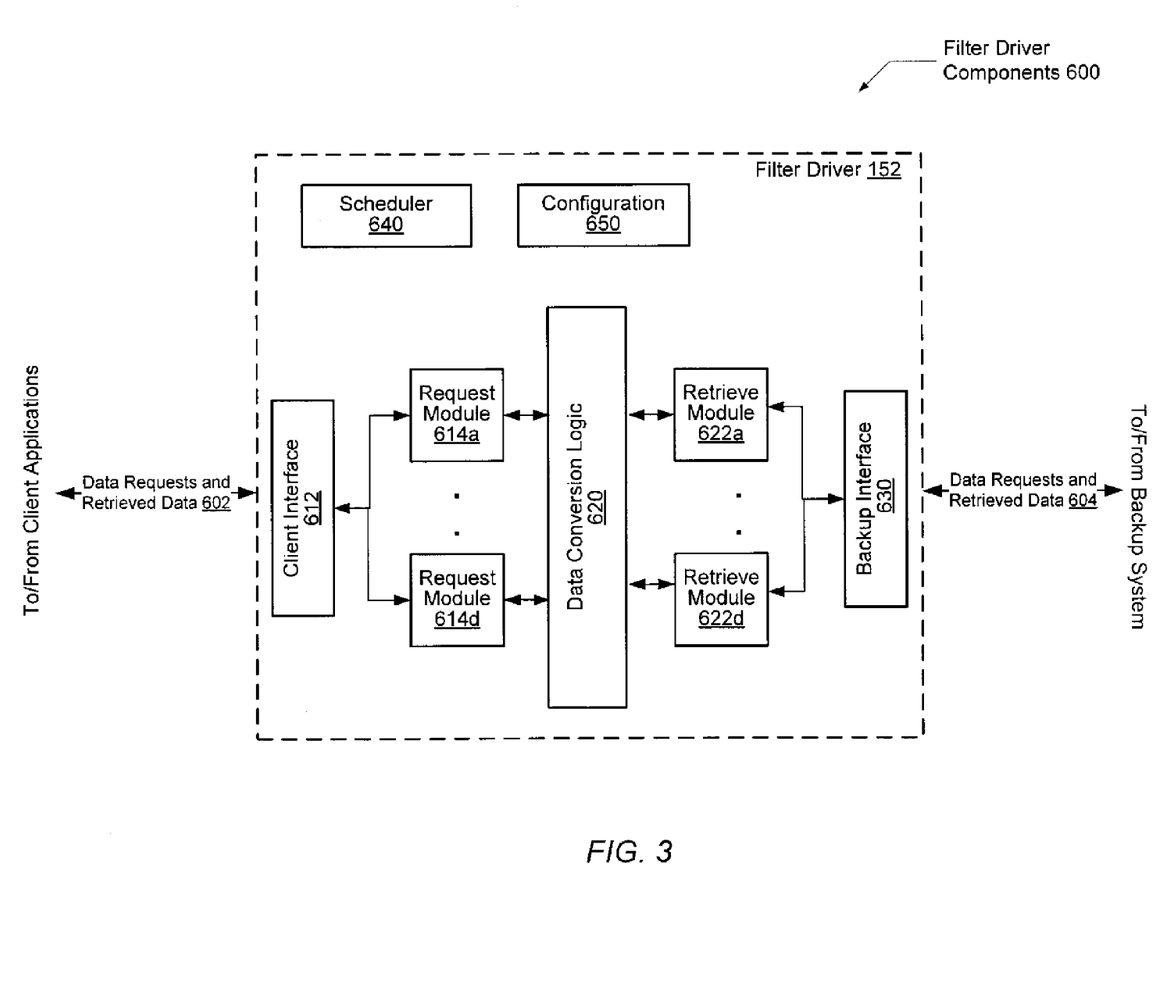
FIG. 3 is a generalized block diagram illustrating one embodiment of the components of a filter driver.

Referring now to FIG. 3, one embodiment of the components 600 of a filter driver is shown. Filter driver 152 may be interfacing to both a client 110 and a backup server 150 via a file system, an input/output (I/O) manager, or otherwise. Filter driver 152 may receive requests 602 from an input/output (I/O) manager, or otherwise, on a backup server 150, wherein the requests may have originated from threads executing on a client 110. A client interface 612 may receive these requests and route them to an appropriate module 614a-614d based on at least a determined file format of the received request 602.

Modules 614a-614d may be amended, added, or deleted based on changes in supported file formats, such as commonly used image backup file formats. As used herein, elements referred to by a reference numeral followed by a letter may be collectively referred to by the numeral alone. For example, modules 614a-614d may be collectively referred to as modules 614. Modules 614 may include logic for disassembling a packet of a particular file format and also for assembling received data from logic 620 to be included in a packet to convey to a client 110. In one embodiment, modules 614 may convey data to logic 620 for converting corresponding format information of the received requests 602 to a format understood by a backup system.

Similar to modules 614, modules 622 may be amended, added, or deleted based on changes in supported file formats, such as a backup system file format. Modules 622 may include logic for disassembling a packet of a particular file format from the backup system and also for assembling received data from logic 620 to be included in a packet to convey to a file system driver 530. In one embodiment, modules 622 may convey data to logic 620 corresponding to received packets from file system driver 530. A scheduler 640 may be used to coordinate the processing of requests and retrieved data both sent and received to both client applications and the backup storage device 160. The scheduler 640 may determine a scheduling policy based on at least predetermined priority levels, bandwidth restrictions, or otherwise. Any configuration information may be stored in configuration 650 that may be updated.

Figure 4:
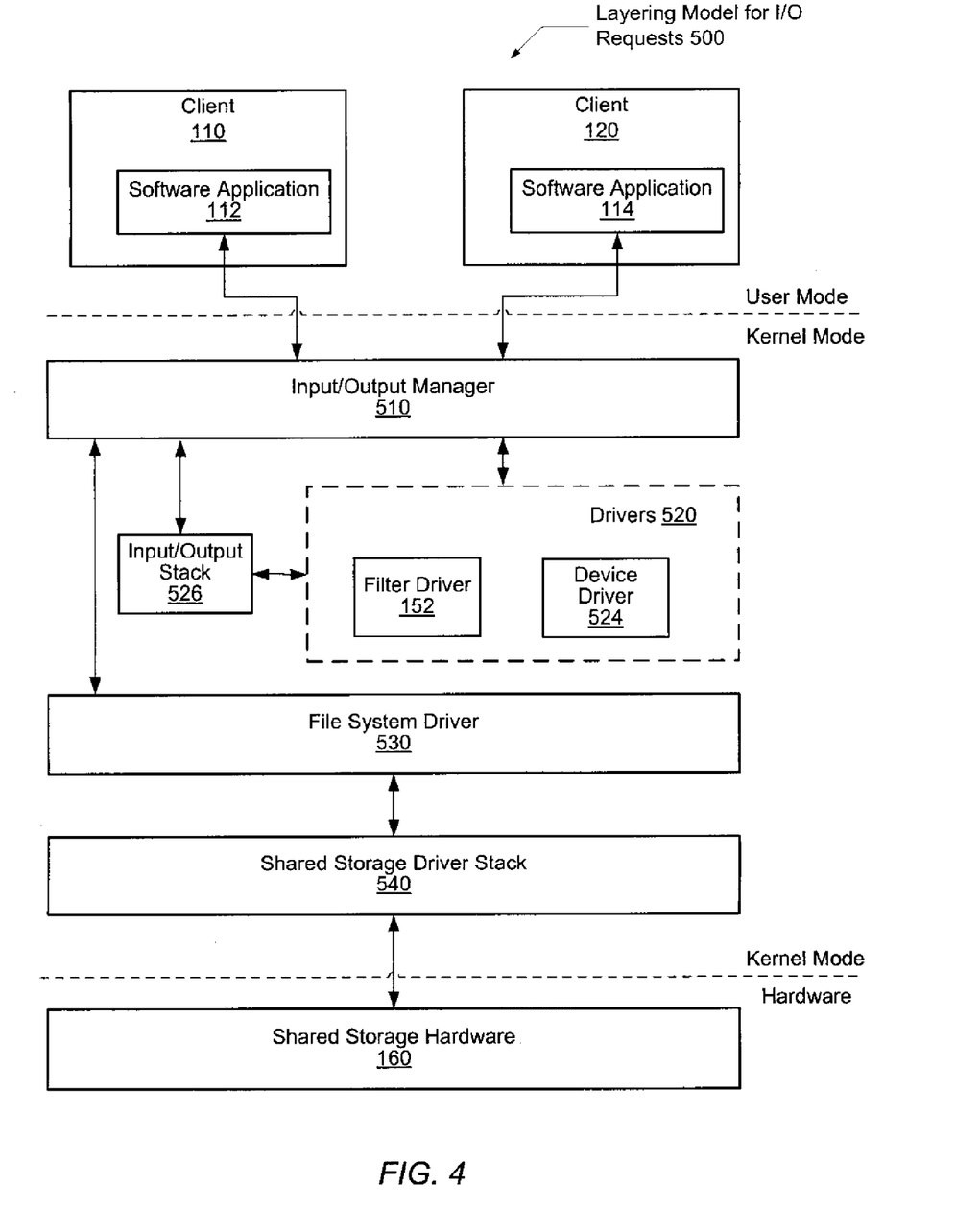
FIG. 4 is a generalized block diagram illustrating one embodiment of an input/output layering model.

Turning now to FIG. 4, one embodiment of an input/output layering model 500 is shown. Similar system components as described above are numbered identically. As shown, model 500 includes user mode components and kernel mode components. Applications 112 and 114 executing on clients 110 and 120 may send read and write, or input/output (I/O), memory requests to an I/O manager 510 on a backup server 150 via a network 180. The I/O manager 510 may receive the requests, create one or more corresponding packets, and route these packets to respective drivers.

Below the I/O manager 510 may be several driver layers. These several driver layers, including both intermediate or device drivers 524 and filter drivers 152 within a driver stack 520, may exist between an application and a piece of hardware. Although only a single driver is shown for both a device driver and a filter driver, several drivers of each category may exist within driver stack 520. These drivers may be grouped together in stacks, or stacks within stack 520, that work together to completely process a request targeted at a particular device. A layered driver model is one manner to process I/O requests. In this model, each driver in a stack 520 may be responsible for processing a part of a request. If the request cannot be completed, information for the lower driver in the stack may be set up and the request is passed along to that driver. Such a layered driver model may allow functionality to be dynamically added to a driver stack 520. It also allows each driver to specialize in a particular type of function and decouples it from having to know about other drivers.

Generally speaking, a filter driver 152 may be used to add features to a device without modifying the underlying device driver 524 or the programs that use the device. Filter drivers may allow modifications to some aspects of an existing driver's behavior without re-writing the underlying driver. Provided routines within I/O manager 510 may be used to redirect I/O requests to a device object, such as file system 154, to the filter driver 152 instead of forwarding them to the driver managing the target device object, such as file system driver 530. In one embodiment, a filter driver 152 may reside within a backup system, such as on backup server 150 in FIG. 1. However, the actual location of filter driver 152 may be in another location. The I/O stack 526 may be used to direct requests to the filter driver 152 regardless of its actual location.

In the embodiment illustrated in FIG. 4, the file system driver 530 and shared storage driver stack 540 are shown outside of driver stack 520 to better associate the drivers with the targeted shared storage 160. However, these drivers may still utilize I/O stack 526 and be logically grouped in a stack or sub-stack within driver stack 520. The filter driver that receives the redirected I/O requests to file system driver 530 may then examine, modify, complete, or pass along the requests it receives to the file system driver 530. For example, filter driver 152 of FIG. 3 may intercept I/O requests to a backup system, wherein the requests correspond to a common image backup file format, such as VHD. The filter driver 152 may then modify the requests to correspond to a file format used by the backup system and then pass these modified requests to file system driver 530. The file system driver 530 may provide a means for users to store information and retrieve it from nonvolatile media such as disks or tapes used in shared storage device 160. The file system driver 530 may be an intended target to receive requests to open, create, read, write and close files on disks. These requests typically originate in a user process, such as a thread executing on client 110 corresponding to instructions of application 112. These requests are dispatched to the file system driver 530 via the I/O manager 510.

The I/O manager 510 may follow a predetermined protocol regarding received requests. Whenever any user's I/O request is received by the I/O manager 510 for a file residing on a mounted logical volume in shared storage 160, the I/O manager 510 normally forwards the request to the file system driver 530 managing the mounted logical volume. Before forwarding the request, however, the I/O manager 510 may check I/O stack 526 to determine if any other driver is layered over the files system driver 530. If so, the I/O manager 510 may redirect the request to that driver, such as filter driver 152, which may be at the top of the layered list or at least ahead of the file system driver 530. Other filter drivers that add security or other features may be layered above both the filter driver 152 and file system driver 530. Therefore, the filter driver 152 may intercept the I/O request before it reaches the file system driver 530.

The filter driver 152 may manipulate intercepted requests, such as converting them to correspond to a different file format. The modified requests may be dispatched to the underlying file system driver 530. The file system driver 530 may not realize that some other filter driver is layered above it and may behave as if the I/O manager 510 has sent the I/O request directly to it.

Figure 5:
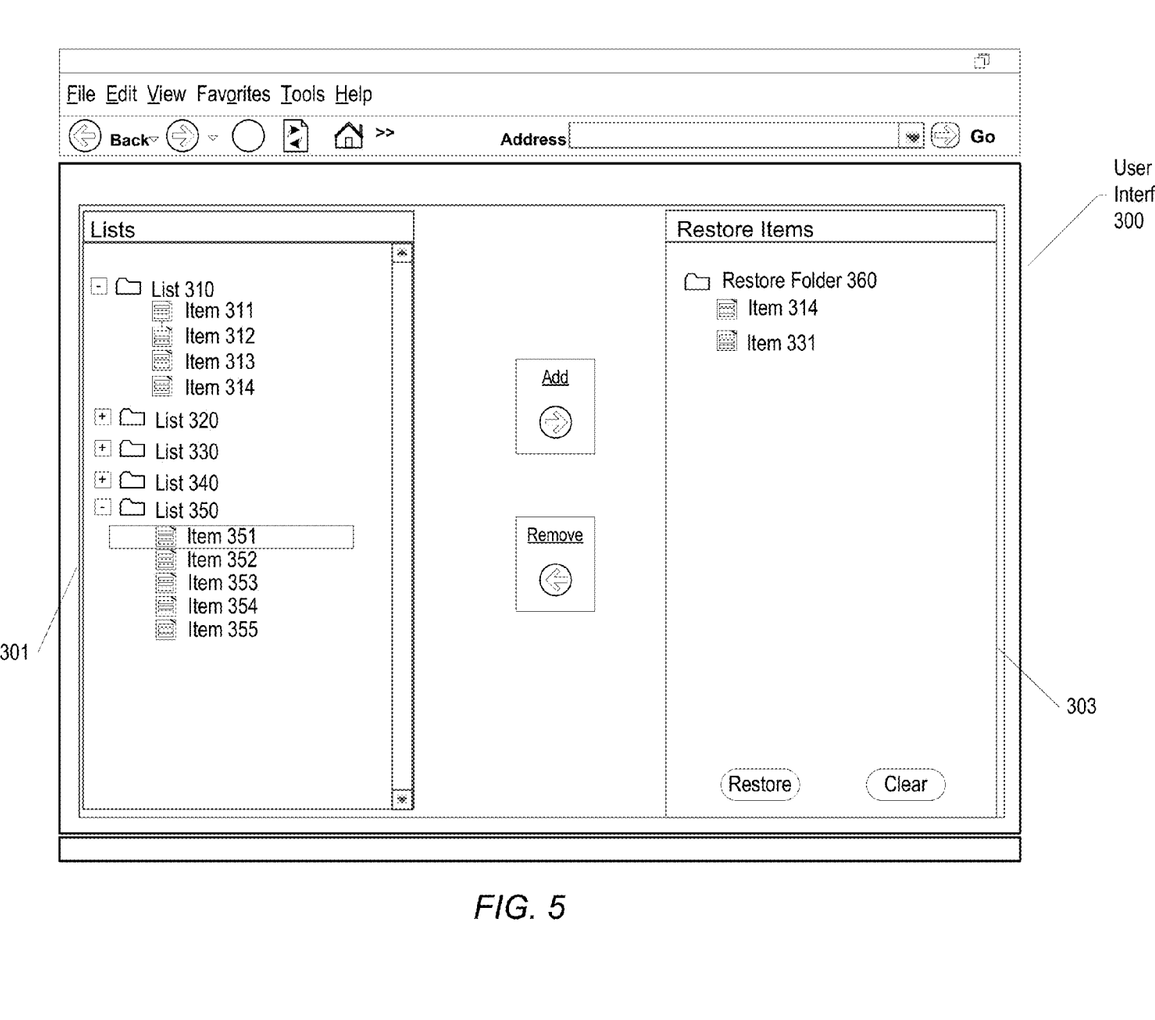
FIG. 5 illustrates one embodiment of user interface that may be presented by a backup application for selecting specific lists or items to be retrieved.

Turning now to FIG. 5, one embodiment of a graphical user interface (GUI) 300 is shown. The GUI 300 may be presented by a file system on backup server 150 of FIG. 1. The GUI 300 may be used for selecting specific lists, files, or items to be restored. Interface 300 may include features such as drop-down menus, a navigation bar, an address field, and so on. Within interface 300 are shown a "Lists" pane 301 and a "Restore Items" pane 303. The interface 300 may include panes, buttons, and functionalities described further below. In one embodiment, the interface 300 may show spoofed files, or files that include image backup files in common file formats that do not actually exist.

Within Lists pane 301, a hierarchy of lists and items may be seen and navigated. The illustrated hierarchy includes lists 310, 320, 330, 340, and 350. List 310 includes items 311-314. List 350 includes items 351-355. Lists and items may be selected as indicated by a highlighted background and added to Restore Items pane 303 via an Add button. Restore Items pane 303 includes a restore folder 360 that includes items 314 and 351 to be restored. Lists and items may be selected and removed from Restore Items pane 303 via a Remove button. Restore Items pane 303 also includes a Restore button and a Clear button. Once a set of restore items has been selected, restoration may proceed. If the Restore button is selected, the items listed in Restore Items pane 303 may be added to a file system where they may be accessed by various applications. If the Clear button is selected, the items listed in the Restore Items pane are removed from the pane.

It is noted that the naming conventions depicted in FIG. 5 (e.g., "List 310", "Item 311", etc.) are provided for ease of discussion. In a typical embodiment, names reflective of those used in ordinary business or other environments (e.g., documents, spreadsheets, image backup files, as well as user-defined list and/or items names, etc.) may be used, as desired. Once a set of items and/or lists has been selected to be restored to the file system, a restore function may perform retrieval and formatting operations that enable various applications to access the retrieved lists/items.

Figure 6:
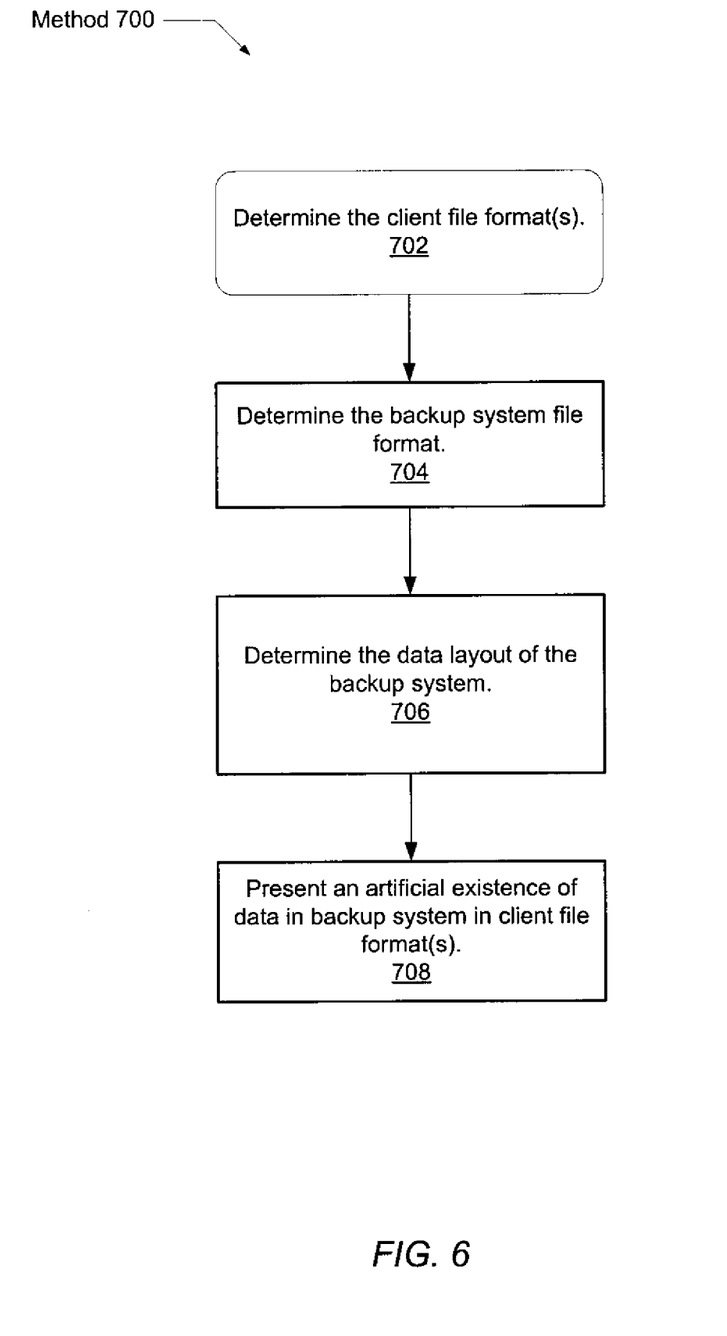
FIG. 6 is a flow diagram illustrating one embodiment of spoofing files of an uncommon file format.

Referring to FIG. 6, one embodiment of a method 700 for spoofing files of an uncommon file format is shown. The components embodied in the computer system described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

In block 702, the filter driver 152 of FIG. 1 may determine supported commonly known file formats for clients 110 and 120 in the computing system 100. In one embodiment, the supported file formats may be read from a file or a predetermined register. Alternately, the supported file formats may correspond to permanently set values within the filter driver 152. Regardless of the input format for the supported file format information, this information may modify or set parameters within a configuration 650 in the filter driver 152. This information may be used to determine which request modules 614 to utilize.

The settings within configuration 650 of the filter driver 152 may be used to determine the file format of a request from an executing thread on a client 110. In one embodiment, the request corresponds to a request for an image backup file for a recovery application executing on client 110. In one example, the filter driver 152 may have preset stored configuration values corresponding to commonly used image backup files, such as VHD, VMDK, and V2I.

In block 704, the filter driver 152 of FIG. 1 may determine the supported file formats for a backup server 150 and backup storage device 160 in the computing system 100. Similar to determining the supported file formats for clients, the filter driver may utilize values stored in the configuration 650 for determining the supported file formats for a backup system. These file formats for a backup system may or may not be a commonly known file format.

In block 706, the filter driver 152 may be able to utilize the corresponding application programming interfaces (APIs) of the file system 154 in order to read a catalog 156 stored in a memory medium 170 of a backup server 150. Alternatively, the filter driver 152 may use the APIs of the file system 154 for sending converted requests for data and interface directly with the catalog 156.

In order to determine and report the data layout within a backup system, the filter driver 152 may utilize the specifications used in the client and the backup system file formats. In one embodiment, the filter driver may utilize the retrieve modules 622 and backup interface 630 of FIG. 3 in order to both send read requests to the catalog 156 and to understand and process the arrangement and semantics of the retrieved data from the catalog 156. As the retrieved data arrives from catalog 156, the filter driver may "piece together" the type and arrangement of data stored in backup storage device 160 along with appropriate status information. The filter driver 152 may be able to convert the backup system file format including at least data arrangement, semantics, and transmission protocol in order to enumerate the stored data and perform this piecing together of the information. By reading the catalog 156, the filter driver 152 may determine the data layout of stored information in backup storage device 160.

As the filter driver 152 determines the data layout of stored information in backup storage device 160, the filter driver 152 may use the client file formats to determine different arrangements and semantics of the same information. A conversion may be performed between the client and backup system file formats in order to piece together the type and arrangement of data read from the catalog 156. This conversion may be used to represent the information in a format an application can process, wherein the application is executing on client 110.

In block 708, the filter driver 152 may expose the data stored in the backup system in a network shareable manner. The filter driver 152 may present, or "spoof", the existence of the stored files in one or more directories on the file system 154. In one embodiment, the files correspond to image backup files. These spoofed files may not consume any space of their own on the file system 154. A user's application may access the file system 154 for browsing, and the filenames with filename extensions indicating the client file formats may be present through a GUI. However, a file utilizing the client file format(s) is not actually stored on backup storage device 160.

Figure 7:
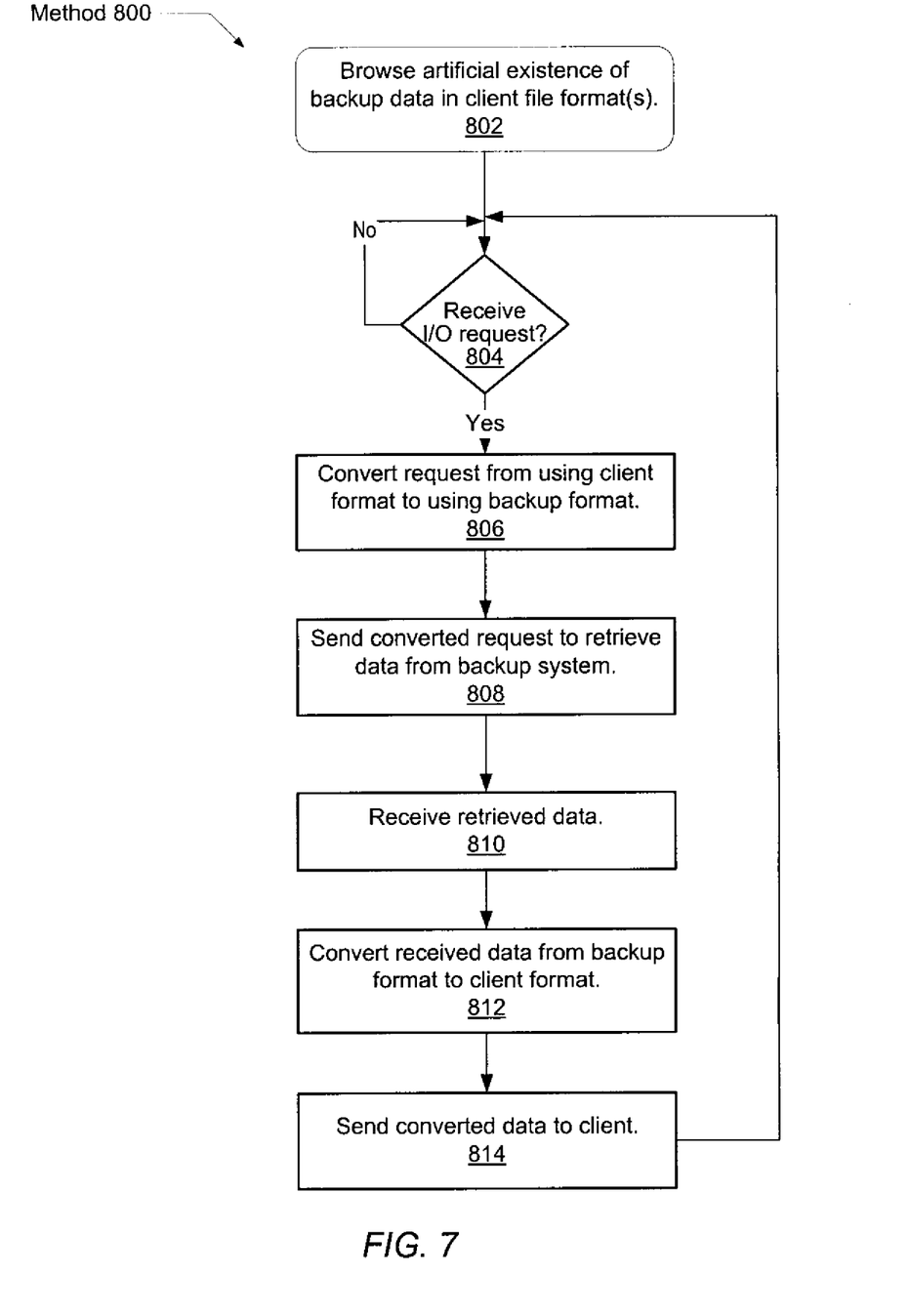
FIG. 7 is a flow diagram illustrating one embodiment of retrieving data for spoofed files.

Referring to FIG. 7, one embodiment of a method 800 for retrieving data for spoofed files is shown. The components embodied in the computer system described above may generally operate in accordance with method 800. Similar to method 700, for purposes of discussion, the steps in this embodiment are shown in sequential order. However, some steps may occur in a different order than shown, some steps may be performed concurrently, some steps may be combined with other steps, and some steps may be absent in another embodiment.

In block 802, a user's application may access the file system 154 for browsing, and the filenames of spoofed files with filename extensions indicating the client file formats may be present through a GUI. However, a spoofed file utilizing the client file format(s) is not actually stored on backup storage device 160. If a request is received for a spoofed file from a client application via an I/O manager or otherwise (conditional block 804), then in block 806, the filter driver 152 intercepts the request and converts the request from the client application file format to the file format of the backup system. In one embodiment, the filter driver 152 maps spoofed files to one or more blocks of data stored in the backup system. Responsive to the request from the client for the spoofed file, the filter driver may convert the request to generate one or more requests for the corresponding blocks of data. In block 808, the filter driver 152 conveys the converted request to the file system 154. The received request may be configured to open, create, read, write, and close files on a disk or other storage medium within backup storage device 160. For a recovery operation being performed by the client application, the request may correspond to a read operation.

After the filter driver 152 sends the converted request to the backup storage device 160 via the file system 154, corresponding data for the request (e.g., the blocks corresponding to the spoofed file) may be received from the file system 154 in block 810. In block 812, the filter driver 152 converts the received data to form the spoofed file (i.e., the spoofed file is now "realized"). Subsequently, in block 814, the filter driver 152 sends the data to the I/O manager or otherwise in order to convey the now realized spoofed file to the client application. Then control flow of method 800 returns to conditional block 804.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for restoring data in a computing system, the method comprising:

accessing data in a data storage medium, said data being stored according to a first file format;

deciphering the first file format by a filter driver coupled to intercept requests for access to the data received from one or more clients;

spoofing the existence of one or more spoofed files that do not exist on the data storage medium, wherein each of the one or more spoofed files corresponds to data stored on the data storage medium;

presenting the spoofed files to a client of the one or more clients for selection to be restored;

receiving a request from the client to restore at least one of said spoofed files;

restoring the at least one of said spoofed files in response to receiving said request, wherein said restoring comprises restoring at least a portion of the data stored on the data storage medium; and reading catalog data, using a backup server, to identify point in time backup images stored on the storage medium.

2. The method as recited in claim 1, wherein each of the one or more spoofed files presented to the client consumes no space on the storage medium.

3. The method as recited in claim 1, wherein in response to the request from the client for the at least one of said spoofed files, the method further comprises:
retrieving one or more blocks of data stored on the data storage medium that correspond to the at least one of said spoofed files;
formatting the one or more blocks of data in order to realize the at least one of said spoofed files; and
conveying the realized at least one of said spoofed files to the client.

4. The method as recited in claim 3, wherein the first file format comprises at least one of the following: a single-instance storage format, and a proprietary format native to a backup system.

5. The method as recited in claim 3, wherein the realized at least one of said spoofed files is formatted according to a second file format utilized by the client.

6. The method as recited in claim 1, further comprising presenting the at least one of said spoofed files as being stored in a spoofed directory.

7. The method as recited in claim 1, further comprising:
spoofing, using the backup server, the existence of one or more spoofed backup images which do not exist on the storage medium; and
presenting, using the backup server, the spoofed backup images to the client.

8. The method as recited in claim 7, further comprising the client conveying a request to the backup server for restoration of one of the spoofed backup images.

9. A computer system comprising:
a backup server coupled to a data storage medium, wherein the backup server is configured to
store data on the data storage medium according to a first file format;
a client configured to convey memory access requests for data stored in the data storage medium, wherein the client is unable to decipher the first file format; and
a filter driver coupled to intercept the requests, wherein the filter driver is configured to:
decipher the first file format;
spoof the existence of one or more spoofed files that do not exist on the data storage medium, wherein each of the one or more spoofed files corresponds to data stored on the data storage medium;
present the spoofed files to the client for selection to be restored;
receive a request from the client to restore at least one of said spoofed files;
restore the at least one of said spoofed files in response to receiving said request, wherein said restoring comprises restoring at least a portion of the data stored on the data storage medium; and
read catalog data to identify point in time backup images stored on the storage medium.

10. The computer system of claim 9, wherein each of the one or more spoofed files presented to the client consumes no space on the storage medium.

11. The computer system of claim 9, wherein in response to the request from the client for the at least one of said spoofed files, the filter driver is configured to:
retrieve one or more blocks of data stored on the data storage medium that correspond to the at least one of said spoofed files;
format the one or more blocks of data in order to realize the at least one of said spoofed files; and
convey the realized at least one of said spoofed files to the client.

12. The computer system of claim 11, wherein the first file format comprises at least one of the following: a single-instance storage format, and a proprietary format native to a backup system.

13. The computer system of claim 12, wherein the realized at least one of said spoofed files is formatted according to a second file format utilized by the client.

14. The computer system of claim 9, wherein the backup server is configured to present the at least one of said spoofed files as being stored in a spoofed directory.

15. The computer system of claim 9, wherein the filter driver is further configured to:
spoof the existence of one or more spoofed backup images; and
present the spoofed backup images to the client.

16. The computer system of claim 15, wherein the client is configured to convey a request to the backup server for retrieval of one of the spoofed backup images.

17. A non-transitory computer-readable storage medium storing program instructions that are executable to:
access data in a data storage medium, said data being stored according to a first file format;
decipher the first file format by a filter driver coupled to intercept requests for access to the data received from one or more clients;
spoof the existence of one or more spoofed files that do not exist on the data storage medium, wherein each of the one or more spoofed files corresponds to data stored on the data storage medium;
present the spoofed files to a client of the one or more clients for selection to be restored;
receive a request from the client to restore at least one of said spoofed files;
restore the at least one of said spoofed files in response to receiving said request, wherein said restoring comprises restoring at least a portion of the data stored on the data storage medium; and
read catalog data to identify point in time backup images stored on the storage medium.

18. The computer-readable storage medium of claim 17, wherein in response to a first request from a client for the at least one of said spoofed files, the program instructions are further executable to:
retrieve one or more blocks of data stored on the data storage medium that correspond to the at least one of said spoofed files;
format the one or more blocks of data in order to realize the at least one of said spoofed files; and
convey the realized at least one of said spoofed files to the client.

19. The computer-readable storage medium of claim 17, wherein the program instructions are further executable to
spoof the existence of one or more spoofed backup images which do not exist on the storage medium; and
present the spoofed backup images to the client.

20. The computer-readable storage medium of claim 19, wherein the program instructions are further executable to receive a request from a client for retrieval of one of the spoofed backup images.

* * * * *